US008226858B2

(12) United States Patent
Demin et al.

(10) Patent No.: US 8,226,858 B2
(45) Date of Patent: Jul. 24, 2012

(54) INTERCONNECT MATERIAL FOR SOLID OXIDE FUEL CELL AND PROCESS FOR THE PREPARATION THEREOF

(75) Inventors: Anatoly Demin, Ekaterinburg (RU); Fyodor Gulbis, Ekaterinburg (RU)

(73) Assignee: Solid Cell, Inc., Rochester, NY (US)

( * ) Notice: Subject to any disclaimer, the term of this patent is extended or adjusted under 35 U.S.C. 154(b) by 944 days.

(21) Appl. No.: 12/216,450

(22) Filed: Jul. 3, 2008

(65) Prior Publication Data

US 2010/0003557 A1  Jan. 7, 2010

(51) Int. Cl.
*H01B 1/08* (2006.01)
*H01M 2/20* (2006.01)

(52) U.S. Cl. ............... 252/519.12; 252/520.2; 429/123; 429/507

(58) Field of Classification Search .............. 252/512, 252/513, 519.12, 520.2, 521.1; 429/507, 429/123, 149
See application file for complete search history.

(56) References Cited

U.S. PATENT DOCUMENTS

| 3,555,667 A | 1/1971 | Carson et al. |
| 5,298,469 A | 3/1994 | Haig et al. |
| 5,614,127 A | 3/1997 | Khandkar et al. |
| 5,639,572 A | 6/1997 | Mori et al. |
| 5,725,965 A * | 3/1998 | Wachsman et al. ........... 429/480 |
| 6,051,330 A | 4/2000 | Fasano et al. |
| 6,054,231 A | 4/2000 | Virkar et al. |
| 6,280,868 B1 | 8/2001 | Badwal et al. |
| 6,326,096 B1 | 12/2001 | Virkar et al. |
| 2011/0229793 A1* | 9/2011 | Kurozumi et al. ............ 429/482 |

FOREIGN PATENT DOCUMENTS

DE  25 14 034  8/1978

* cited by examiner

*Primary Examiner* — Mark Kopec
(74) *Attorney, Agent, or Firm* — R. J. Lasker, Esq.

(57) ABSTRACT

An interconnect composite material having a coefficient of thermal expansion close to that of zirconia electrolyte, high electrical conductivity, high stability in both oxidizing and reducing atmosphere at temperatures from 600 to 900° C. and having the following general composition

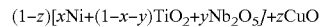

$$(1-z)[xNi+(1-x-y)TiO_2+yNb_2O_5]+zCuO$$

where x, y and z are corresponding parties of weight. An interconnect plate of this material is manufactured by sintering an intermediate $TiO_2$—$Nb_2O_5$ composition, grinding it to a powder, combining the powder with NiO, CuO and an organic binder, tape casting the mixture, stacking the fabricated film into multiple layers, repeated rolling of the multiple layers into sheets and two-step sintering of the sheets in an air atmosphere at the first step and in a hydrogen atmosphere at the final step.

5 Claims, No Drawings

INTERCONNECT MATERIAL FOR SOLID OXIDE FUEL CELL AND PROCESS FOR THE PREPARATION THEREOF

BACKGROUND OF THE INVENTION

Description of Prior Art

Solid oxide fuel cells (SOFCs) are electrochemical devices for direct conversion of a fuel's chemical energy into electrical energy. A single cell is composed of an electrolyte and two electrodes. Since the single cell has a maximum voltage of about 1 V, several cells must be joined together in a stack to provide an acceptable voltage level for practical applications. In the planar design, the single cells are connected to each other via an interconnect which provides electrical connection of the cells and gas tight separation of gas flows in the stack.

The interconnect must satisfy the following requirements:
- have acceptable level of electronic conductivity and negligible ionic conductivity;
- have a coefficient of thermal expansion (CTE) which closely matches the electrolyte;
- have sufficient mechanical strength;
- be chemically and thermodynamically stable at both high and low oxygen partial pressures at operating temperatures;
- not contain materials that could poison electrode catalysts.

The design of an interconnect material which combines the five attributes above is very difficult.

Many materials for application as interconnects in SOFCs have been patented since the beginning of 1970s. Carlson at al. U.S. Pat. No. 3,555,667, proposed electrically conductive hermetic seal comprised of platinum and gold. Such interconnects have no commercial prospective because of high cost.

A number of patents were devoted to interconnects based on lanthanum chromites, as exemplified by U.S. Pat. No. 5,298,469 issued Mar. 29, 1994, U.S. Pat. No. 5,614,127 issued Mar. 25, 1997, and U.S. Pat. No. 5,639,572 issued Jun. 17, 1997. The main drawbacks of this material are low conductivity in the fuel atmosphere and a loss of lattice oxygen in the fuel atmosphere that leads to the dependence of its lattice parameter on the oxygen partial pressure. The latter, in turn, leads to appearance of mechanical strength in the interconnect when it separates air and fuel atmospheres and to ionic conductivity which causes non-electrochemical (useless) fuel burning.

A cermet including partially stabilized zirconia and a superalloy is described in U.S. Pat. No. 6,051,330 issued Apr. 18, 2000. However the superalloy composition is not fixed in the patent. Inconel 600 is given as an example of a usable embodiment but it is not clear if this material can actually be stable under SOFC working conditions during long periods of time.

Some patents propose coating the superalloy by various layers in order to protect the superalloy surface against corrosion. For example, in U.S. Pat. No. 6,054,231 issued Apr. 25, 2000, the following metals were offered as the protective layer: copper, iron, nickel, silver, gold, platinum, palladium, iridium, and rhodium. The first three metals are insufficiently stable in an oxidizing atmosphere, silver is an easily vaporizable metal and the remaining metals are very expensive for commercially acceptable SOFCs. Coating a plate-like chromium-containing substrate by noble metals was proposed also in U.S. Pat. No. 6,280,868 issued Aug. 28, 2001. As to an anode side of the superalloy interconnect, U.S. Pat. No. 6,326,096 issued Dec. 4, 2001 proposed to use nickel or copper as a protective layer.

It is necessary to point out that all proposed alloys not containing noble metals contain chromium and give off chromium oxides that poison electrode catalysts.

SUMMARY OF THE INVENTION

One aspect of the invention relates to an interconnect material corresponding to the general formula

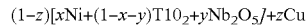
$$(1-z)[x\text{Ni}+(1-x-y)\text{TiO}_2+y\text{Nb}_2\text{O}_5]+z\text{Cu}$$

where x, y and z are corresponding parties of weight. The interconnect material having (CTE) varying from $9*10^{"6}$ to $12*10^{"6} \text{K}^{-1}$ if x varies from 0.33 to 0.45, y equal to 0.095 and z equal to 0.01; the material has the CTE substantially close to that of zirconia electrolyte if x varies in a range from 0.355 to 0.365.

Another aspect of the invention relates to the method of making of an interconnect plate of this material comprising:
sintering an intermediate interconnect material of a composition

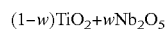
$$(1-w)\text{TiO}_2+w\text{Nb}_2\text{O}_5$$

with subsequent grinding,
combining the powder with powders of nickel and copper oxides and an organic binder,
tape casting of the mixture,
stacking the obtained film into multiple layers,
repeated rolling of the fabricated multiple layers to produce sheets,
sintering the sheets in an air atmosphere to reach a dense condition, followed by sintering in a hydrogen atmosphere to reach the final interconnect composition.

DETAILED DESCRIPTION OF THE INVENTION

The material for the interconnect, according to the present invention, is a cermet comprised of defined amounts of oxides and metals. The oxides are $\text{TiO}_2$ (mainly) and a small amount of $\text{Nb}_2\text{O}_5$; the metals are Ni (mainly) and a small amount of Cu. The metal phase provides sufficient electrical conductivity in a reducing atmosphere. In an air atmosphere, electrical conductivity is provided by a surface film including initial oxides and Ni- and Cu-oxides, all the oxides having sufficient conductivity. The composite material is near and above the theoretical percolation limit in order to provide high electronic conductivity. A general composition of the interconnect composite material is as follows:

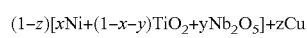
$$(1-z)[x\text{Ni}+(1-x-y)\text{TiO}_2+y\text{Nb}_2\text{O}_5]+z\text{Cu}$$

where x, y and z are corresponding parties of weight, x is in a range from 0.33 to 0.45, y is in a range from 0.07 to 0.13, and z is in the range from 0.005 to 0.02.

The coefficient of thermal expansion (CTE) of the proposed interconnect material can be easily matched to the CTE of the other SOFC components by varying the Ni content in the cermet. It is known that the electrolyte CTE depends on its composition. Therefore it is very important to fit the interconnect CTE to that of the electrolyte, thus preventing cracking at the interconnect/electrolyte interfaces during heating or cooling. The interconnect material CTE varies from $10_6$ to $12*10^{-6} \text{K}^{-1}$ if x varies from 0.33 to 0.45, y equal to 0.095 and z equal to 0.01. The material has the CTE substantially close to that of zirconia electrolyte if x varies in a range from 0.355 to 0.365.

The proposed interconnect material can be made in the form of a plain plate or disc that is an integral part of a stack of planar design.

Appropriate ceramic and/or metal powders must be chosen for each stage of the interconnect plate manufacturing. Corresponding binders and solvents, milling equipment as well as milling regimes must be chosen to mix/grind the various ingredients/components. The interconnect plate manufacturing represents a chain of the following steps:

1) combining titanium oxide and niobium oxide powders in an appropriate ratio;
2) sintering the mixture of 1) in air at 1350-1400° C.;
3) grinding the sintered material of 2) to a powder;
4) combining the powder of 3) with powders of nickel oxide, copper oxide and an organic binder;
5) tape casting the mixture of 4);
6) stacking the film of 5) into multiple layers (8 to 16);
7) repeated (5-10) rolling of the multiple layers of 6) to produce sheets of a thickness of 0.3 to 1 mm;
8) cutting sheets of 7) to plates of required shape and size;
9) sintering sheets of 8) in an air atmosphere at 900 to 950° C. to reach a dense condition;
10) sintering sheets of 9) in a wet hydrogen atmosphere at 1350 to 1400° C. to reach the final interconnect composition.

Being sintered on a plain substrate of, for instance, alundum (corundum) the plates do not require additional mechanical treatment Sample Compositions The CTE of known YSZ electrolytes varies in the range from 9.7 to $10.00 \times 10^{-6} K^{-1}$. An interconnect of the composition $0.99[0.355Ni+0.55TiO_2+0.95Nb_2O_5]+0.01Cu$ has the former CTE value and an interconnect of the composition $0.99[0.365Ni+0.54TiO_2+0.095Nb_2O_5]+0.01Cu$ has the latter value CTE.

We claim:

1. A composite interconnect material for a solid oxide fuel cell, comprising:

A $TiO_2$ phase and a $Nb_2O_3$ phase mixed with metallic Ni and Cu having a general composition:

$$(1-z)[xNi+(1-x-y)TiO_2+yNb_2O_3]+zCu;$$

wherein $0.33 \leq x \leq 0.45$, $0.07 \leq y \leq 0.13$ and $0.005 \leq z \leq 0.02$.

2. The interconnect material as in claim 1 formed in the shape of a plate.

3. The interconnect as claimed in claim 2 has a CTE ranging from $9 \times 10^{-6}$ to $12 \times 10^{-6}$.

4. The interconnect material as in claim 1 formed in the shape of a tube, rod, wire, foil, and similar solid surfaces.

5. The composite interconnect material as in claim 1, wherein the coefficient of thermal expansion (CTE) ranges from $9 \times 10^{-6}$ to $12 \times 10^{-6}$ as the corresponding weight ratios of x, y and z are varied.

* * * * *